(12) United States Patent
Decarli et al.

(10) Patent No.: US 11,982,185 B2
(45) Date of Patent: May 14, 2024

(54) BARRIER ASSEMBLY

(71) Applicant: ENI S.P.A., Rome (IT)

(72) Inventors: Luca Decarli, San Donato Milanese (IT); Laura La Rosa, San Donato Milanese (IT); Alberto Renato De Angelis, San Donato Milanese (IT); Andrea Vignali, Lodi (IT)

(73) Assignee: ENI S.P.A., Rome (IT)

( * ) Notice: Subject to any disclaimer, the term of this patent is extended or adjusted under 35 U.S.C. 154(b) by 18 days.

(21) Appl. No.: 17/430,783

(22) PCT Filed: Feb. 13, 2020

(86) PCT No.: PCT/IB2020/051197
§ 371 (c)(1),
(2) Date: Aug. 13, 2021

(87) PCT Pub. No.: WO2020/165828
PCT Pub. Date: Aug. 20, 2020

(65) Prior Publication Data
US 2022/0154578 A1    May 19, 2022

(30) Foreign Application Priority Data

Feb. 13, 2019    (IT) .......................... 102019000002079

(51) Int. Cl.
*E21F 7/00* (2006.01)
*B01D 53/22* (2006.01)
(Continued)

(52) U.S. Cl.
CPC ................ *E21F 7/00* (2013.01); *B01D 53/22* (2013.01); *B01D 53/229* (2013.01); *B01J 8/009* (2013.01);
(Continued)

(58) Field of Classification Search
None
See application file for complete search history.

(56) References Cited

U.S. PATENT DOCUMENTS

| | | |
|---|---|---|
| 4,297,821 A | 11/1981 | Peters |
| 2003/0047078 A1 | 3/2003 | Ueki et al. |
| 2009/0007529 A1* | 1/2009 | Tramontina .......... E04G 21/243 55/356 |

FOREIGN PATENT DOCUMENTS

| | | | |
|---|---|---|---|
| JP | H08333959 A | 12/1996 | |
| JP | 2003-27605 | * 1/2003 | ............... E04B 1/62 |
| JP | 2003027605 A | 1/2003 | |

OTHER PUBLICATIONS

International Search Report dated Apr. 14, 2020 for PCT application No. PCT/IB2020/051197.

(Continued)

*Primary Examiner* — Jason M Greene
(74) *Attorney, Agent, or Firm* — Ruggiero McAllister & McMahon LLC

(57) ABSTRACT

A barrier assembly used in the protection of personnel at worksites and/or residential areas from escapes of gas. Such a barrier assembly controls the lateral and vertical spread of gas in the event of an escape of the gas, even more particularly toxic gas. The barrier assembly can be used at operating sites where gases are produced, and in particular where high concentrations of toxic gases (e.g. CO2, H2S, SO2, mercaptans etc.) are present. The barrier assembly can, optionally act as a safety system in the event of an accidental uncontrolled release of these toxic gases into the atmosphere.

11 Claims, 4 Drawing Sheets

(51) Int. Cl.
*B01J 8/00* (2006.01)
*E04B 1/94* (2006.01)
*E04B 2/74* (2006.01)
*E04G 21/24* (2006.01)

(52) U.S. Cl.
CPC ............ *E04B 1/946* (2013.01); *E04B 2/7457* (2013.01); *E04G 21/243* (2013.01)

(56) References Cited

OTHER PUBLICATIONS

Written Opinion dated Apr. 14, 2020 for PCT application No. PCT/IB2020/051197.

* cited by examiner

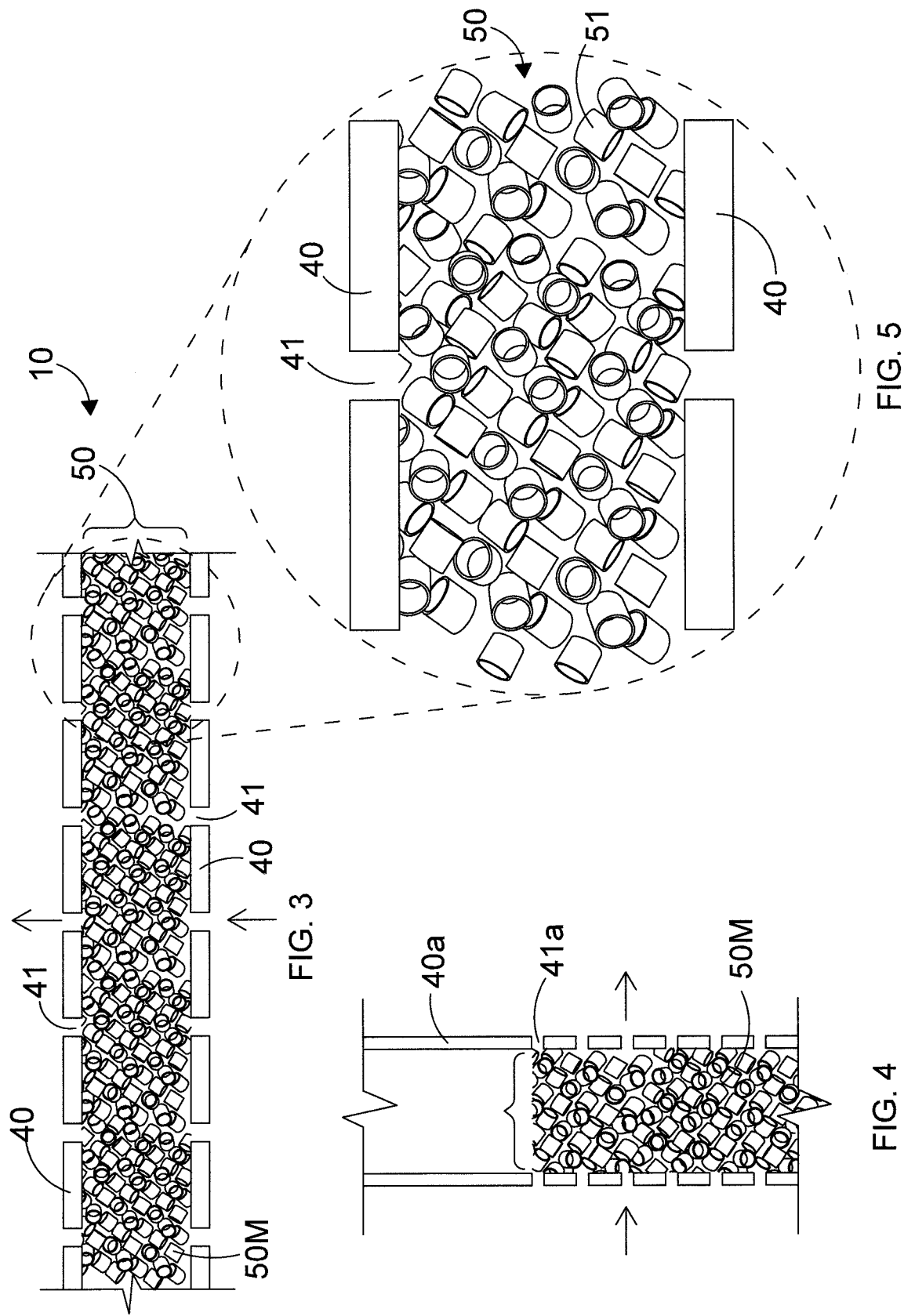

BARRIER ASSEMBLY

CROSS-REFERENCE TO RELATED APPLICATIONS

This application is a national stage application, filed under 35 U.S.C. § 371, of International Patent Application No. PCT/US PCT/IB2020/051197, filed on Feb. 13, 2020, that claims priority from Italian Patent Application No. 102019000002079 filed on Feb. 13, 2019, the entire disclosure of each of which is incorporated herein by reference.

BACKGROUND OF THE DISCLOSURE

1. Field of the Disclosure

The present disclosure relates to a barrier assembly for use in protection of personnel at worksites and/or residential areas from escapes of gas. More particularly, this disclosure relates to a barrier assembly for controlling the lateral and vertical spread of gas in the event of an escape of said gas, even more particularly toxic gas. The disclosure finds application in all operating sites where gases are produced, and in particular where high concentrations of toxic gases (e.g. $CO_2$, $H_2S$, $SO_2$, mercaptans etc) are present, optionally acting as a safety system in the event of an accidental uncontrolled release of these toxic gases into the atmosphere.

2. Description of the Related Art

Barrier assemblies can be a valuable protective addition to many industrial locations. A particularly relevant example is the use of blast barriers on offshore topside modules during hydrocarbon exploration and production to protect the personnel, and the structure, from the effects of an explosive release from a wellbore. Similarly, fire barrier walls act to preserve life and structure integrity for a given time period to reduce injury and loss, and allow escape.

Just as an explosive release, or an ignition reaction, is a serious safety concern during hydrocarbon production, the escape of toxic gases is also a significant risk to personnel working around an oil field or operating/refining plants. Due to the potential for toxic gases to be carried on the wind, there is a further risk to life and health of third parties in nearby residential areas, where the gases may reach before their concentration has fallen to a non-hazardous level.

It would be advantageous to have a physical barrier that may be placed between locations where toxic gases are present, such as oil or gas pipelines or plants, and locations occupied by personnel or third parties.

JP2003027605 discloses a concrete board of a garage, buildings or the like, wherein only a section thereof is porous to be in communication with the outside, thus improving the air purifying action inside said garage, buildings or the like.

SUMMARY OF THE DISCLOSURE

According to a first aspect of the present disclosure there is provided a barrier assembly for confining gas, the barrier assembly comprising a gas permeable wall member permitting passage of the gas through the wall member.

The barrier assembly optionally comprises a frame for supporting the wall member. The wall member is optionally adapted to connect to the frame.

Optionally the wall member comprises at least one panel that is optionally connectable to the frame. Optionally the wall member comprises a plurality of openings e.g. perforations. The openings permit gas to pass through the barrier.

A great advantage of using gas-permeable wall members to mitigate gas leaks is that the gas-permeability maintains natural ventilation so surprisingly reducing the formation of a potentially explosive atmosphere where the leaking gas meets the barrier assembly, e.g. at the gas leak side, for example where the gas may be flammable. A gas permeable barrier assembly with e.g. openings or perforations to admit gas is also surprisingly effective at controlling e.g. reducing lateral spread of the leaked gas in particular.

Optionally the barrier assembly reduces lateral and/or vertical spread of leaked gas.

Optionally a frame can connect to another frame. Optionally two or more barrier assemblies can be connected together to create the required size of barrier in a modular fashion. Optionally frames may be connected vertically or laterally to increase the height or to increase the length/width of the resulting barrier. One example of a barrier assembly may be 10 metres in height and 20 metres in length. Advantageously, the modularity of the barrier assembly permits a user to select a suitable length that will reduce high concentrations of toxic gases escaping around the ends of the barrier assembly, or alternatively, to select a length that will allow the gas to diffuse in a safe location that is away from personnel and residential areas.

Thus according to an optional feature the barrier assembly comprises a modular arrangement of wall members connected together. Optionally the wall members can be adapted to be interconnected, e.g. by having lugs or other formations adapted to interconnect between adjacent wall members.

Optionally the barrier assembly comprises a base into which at least part of the or each frame is secured. Optionally the base provides support and/or stability for the barrier assembly during use. Optionally the base is movable, for example, the base may comprise ballast weight that provides stability for the wall in use but optionally allows removal of the base to another site when the risk of gas leakage has passed. Alternatively, the base may comprise ground anchors or similar non-permanent ground fixings that permit removal of the base once the barrier is no longer required. For example, there is generally a higher risk of dangerous gas escaping during wellbore drilling operations than during production, and therefore a barrier may be put in place during drilling and removed once production begins.

Optionally when in use the frame, and therefore the wall member, is substantially vertical. However, inclined frames and wall members, possibly having inclined only the side facing the leaking source, are not excluded from the scope of the present disclosure, particularly, frames and/or wall members that are inclined up to 30° with respect to the perpendicular to the soil. Inclined walls may be more resistant to strong impacts following, e.g. an explosion. Optionally at least one of the faces of the barrier assembly is inclined away from the leak source.

Optionally multiple wall members can be connected to a frame. Optionally wall members may be connected on either side of a frame to create a rectangular barrier, optionally with the wall members spaced apart from one another, optionally creating a space or gap within the barrier. Optionally the wall members can be generally parallel, for example, they can be connected to e.g. opposite parallel faces of e.g. upright frame members.

Optionally each wall member may be connected to the frame by fixing means. Optionally the fixing means may be threaded fixings, or clip fixings, or another fixing means that is suitably secure.

Optionally the barrier assembly has an inlet side (e.g. facing towards a higher concentration of the gas) and an outlet side (e.g. on which the concentration of gas is lower than on the inlet side).

Moreover, the inlet side of the barrier assembly is a gas permeable wall member (i.e. all the surface of the inlet side is gas permeable) and the barrier assembly is provided with a space between said two sides.

Gas optionally diffuses from the inlet side to the outlet side, through the barrier assembly.

Optionally the barrier assembly is made from lightweight, optionally low-cost material. Frame members can optionally be hollow.

Barrier members may have external panels to support the frame materials inside the barrier. Wall members may comprise external panels fixed to the frame. Wall members may be made of any material able to support and contain the material of the barrier assembly e.g. the material inside the wall member and could comprise, for example, concrete, plastic, composite, metallic (e.g. aluminium, stainless steel) sheets.

Optionally the space formed between the wall members may be left empty. Optionally the space may be at least partially filled with material. Optionally the space can be subdivided into filled spaces and empty spaces, with the filled spaces filled with material and the empty spaces unfilled.

Optionally the material may be chemically inert. Optionally the material can be particulate, comprising particles of regular or irregular shape, forming a particulate bed of the material within the space.

Optionally the arrangement of the material in the space can be random, optionally creating numerous pathways through the space, allowing for diffusion of gas through the pathways. Optionally the gas flowing through the barrier assembly from an inlet opening or perforation to an outlet opening or perforation is diverted from a straight path through the barrier assembly, optionally by the material within the space. Thus gas passing through the barrier assembly is forced along a labyrinthine pathway which assists in the diffusion of the gas along the barrier assembly.

The space may be filled, wholly or partially, with material. Optionally the material can provide an increased surface area for interaction between the gas and the material. Optionally the material can adsorb and optionally retain the gas. Optionally the material can comprise a ceramic material, optionally ceramic Raschig rings. Optionally some or all of the material may be in the form of a matrix. For example, optionally the Raschig rings previously described may be held and supported by a material matrix within the wall.

Optionally, the material may comprise a chemically inert material, for example silicone or silica. Alternatively, the material may at least partially include a reactive material (such as a ferrous compound or composition) selected for its ability to react with one or more gases of interest. One example may be a matrix comprising ferric hydride oxide dispersed over a matrix such as silica, where the target gas is hydrogen sulphide, but a different matrix with a different reactive material can be useful for different target gasses. Optionally more than one reactant can be included in the material to enable the matrix to react with more than one type of gas.

The reaction that takes place leads to the abatement of $H_2S$ (or toxic gas) by the gas leak. Non limiting examples of hazardous chemical species that can be part of a gaseous stream to be confined by the barrier assembly according to the present disclosure are hydrogen sulfide ($H_2S$), carbon monoxide (CO), ammonia ($NH_3$), low molecular weights amines like methylamine, carbonyl dichloride (phosgene), chlorine, fluorine, hydrochloric acid (HCl), sulphuric anhydride ($SO_3$), nitrogen oxides, sulphur dioxide, mercaptans like methylsulfide, dimethylsulfide, methylchloride, methylenechloride, carbon dioxide and mixtures thereof, like synthesis gas.

The skilled person shall select, based on the knowledge of the properties of the hazardous substance, the preferred reactant to be included into each barrier member of the reactive barrier. Specific absorbers and adsorbers of well-known industrial hazardous substances are known and available in the market. Suitable examples of chemical and physical absorber, particularly for $H_2S$ and mercaptans are activated carbon, zinc oxide, iron oxide, molecular sieves and zeolites, for example Sulfur removal sorbent (composition information on ingredients: Copper oxide >70%, Manganese Dioxide <30% and Aluminium oxide <10%), Sulphur removal sorbent (composition information on ingredients: Cupric Hydroxide >60, Potassium Nitrate <2% and Aluminium oxide <10%), Sulphur removal sorbent (composition information on ingredients: Manganese Dioxide <40%, Manganese Carbonate >60%, Potassium Hydroxide <15% and Aluminum oxide <10%), Sulphur removal sorbent (composition information on ingredients: Copper (II) hydroxide <20%, Aluminosilicate <40% and Proprietary Material >45%), Sulphur removal sorbent (composition information on ingredients: Activated Charcoal >80 and Potassium Hydroxide <20).

An example of reactive material is the scavenger R7J ($H_2S$ scavenger) produced by Sulfatrap®.

Activated carbon is available on the market as non-impregnated material, or as active carbon impregnated with e.g. KOH.

Optionally openings or perforations in the wall member(s) may comprise multiple apertures through the material of the wall member, optionally extending from one side of the wall member to the other, and optionally creating a flow path for gas from the outside of the barrier assembly to the internal space. For example, the openings or perforations may be substantially round holes extending through at least one face of the wall member (and optionally through the wall member from one side to the other) having a certain diameter and a certain spacing which can be varied in order to retain different material within the barrier assembly.

Optionally, the barrier assembly has a thickness (cross-distance from one side to the other) ranging from 10 to 100 cm, more preferably from 20 to 80 cm. The void fraction (or empty space within the barrier assembly) is optionally from 5 to 40%, more particularly from 10 to 30%, e.g. 15%-30%. The average diameter (or equivalent diameter) of the apertures is optionally comprised within 0.2 and 3.0 cm, more particularly between 0.5 and 2.0 cm.

Optionally, the wall member may comprise a mesh. Optionally the openings or perforations are regularly spaced in a repeating pattern on the wall member. This is useful as it resists the build-up on gas on an inlet side of the barrier assembly as it presents regularly-spaced pathways through the wall member for diffusion of the gas from the inlet side.

Optionally the matrix occupying the space can comprise a gas scavenger, adapted to attract and retain active or harmful components of the gas, e.g. $H_2S$. Scavengers can optionally retain active and harmful components of the gas without chemically altering the components.

Optionally the barrier assembly may be wholly filled with a matrix comprising a material that reacts with active or harmful components of the target gas. Optionally the barrier assembly is partially filled with a matrix that comprises a material that reacts with the target gas. Optionally the material within or on the matrix is chemically reactive with the target gas, and can chemically alter the components of the gas. Optionally only some of the material within the barrier assembly can comprise reactive material, hence for example, the barrier can comprise some wall members that are passive, and merely force the gas to diffuse through the barrier, without any chemical reaction between the gas and the material of the barrier assembly, and optionally some of the barrier (or portions of the barrier) can incorporate reactant scavengers to adsorb, retain or react with the gas to change its chemical structure.

Optionally the material is gas-porous. Optionally the material is liquid-porous, for example, the material can optionally permit penetration of liquids into pores of the material to retain some of the liquid (or to retain compounds dissolved in the liquid) within the pores.

Optionally the barrier assembly is partially filled with a matrix comprising a material that reacts with the target gas. For example, the barrier assembly may be filled to a certain height/vertical level. This can be advantageous in providing sufficient dissipation of the gas and rapid reduction in concentration of the gas, while reducing material costs in comparison with fully filled barrier assemblies. This arrangement is particularly suitable for locations where gas is being transported at a low level such as through pipelines, for example.

The disclosure also provides a method of containing a gas leak, using a barrier assembly comprising a gas-permeable wall member, wherein the method comprises arranging the barrier assembly in proximity to a gas leak and diffusing the gas through the wall member.

Optionally the barrier assembly is arranged to form a wall between personnel and the gas leak.

The disclosure also provides a safety system comprising a first barrier assembly including a gas permeable wall element and an inner space, and a second barrier assembly with an inner space, wherein said first barrier assembly is placed closer to the gas leak than the second barrier assembly.

Said second barrier assembly may include or not include a reactive composition within the space.

The various aspects of the present disclosure can be practiced alone or in combination with one or more of the other aspects, as will be appreciated by those skilled in the relevant arts. The various aspects of the disclosure can optionally be provided in combination with one or more of the optional features of the other aspects of the disclosure. Also, optional features described in relation to one aspect can typically be combined alone or together with other features in different aspects of the disclosure. Any subject matter described in this specification can be combined with any other subject matter in the specification to form a novel combination.

Various aspects of the disclosure will now be described in detail with reference to the accompanying figures. Still other aspects, features and advantages of the present disclosure are readily apparent from the entire description thereof, including the figures, which illustrates a number of exemplary aspects and implementations. The disclosure is also capable of other and different examples and aspects, and its several details can be modified in various respects, all without departing from the scope of the present disclosure as defined by the claims. Accordingly, each example herein should be understood to have broad application and is meant to illustrate one possible way of carrying out the disclosure, without intending to suggest that the scope of this disclosure, including the claims, is limited to that example.

Furthermore, the terminology and phraseology used herein is solely used for descriptive purposes and should not be construed as limiting in scope. Language such as "including", "comprising", "having", "containing" or "involving" and variations thereof, is intended to be broad and encompass the subject matter listed thereafter, equivalents and additional subject matter not recited and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present disclosure. It is not suggested or represented that any or all of these matters formed part of the prior art base or were common general knowledge in the field relevant to the present disclosure.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including" or "is" preceding the recitation of the composition, element or group of elements and vice versa. In this disclosure, the words "typically" or "optionally" are to be understood as being intended to indicate optional or non-essential features of the disclosure which are present in certain examples but which can be omitted in others without departing from the scope of the disclosure.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described to refer to the orientation of features shown in the drawings, and are not to be interpreted as limiting the disclosure to the literal interpretation of the term, but instead should be as understood by the skilled addressee.

BRIEF DESCRIPTION OF THE DRAWINGS

Examples of the present disclosure are shown, by way of example only, in the accompanying drawings, in which:

FIG. 3 shows a plan section view through the FIG. 1 assembly;

FIG. 4 shows a side section view through an alternative example of the FIG. 1 assembly;

FIG. 5 shows a detailed view of a portion of the FIG. 3 view; and

DETAILED DESCRIPTION OF THE DISCLOSURE

Figure 1:
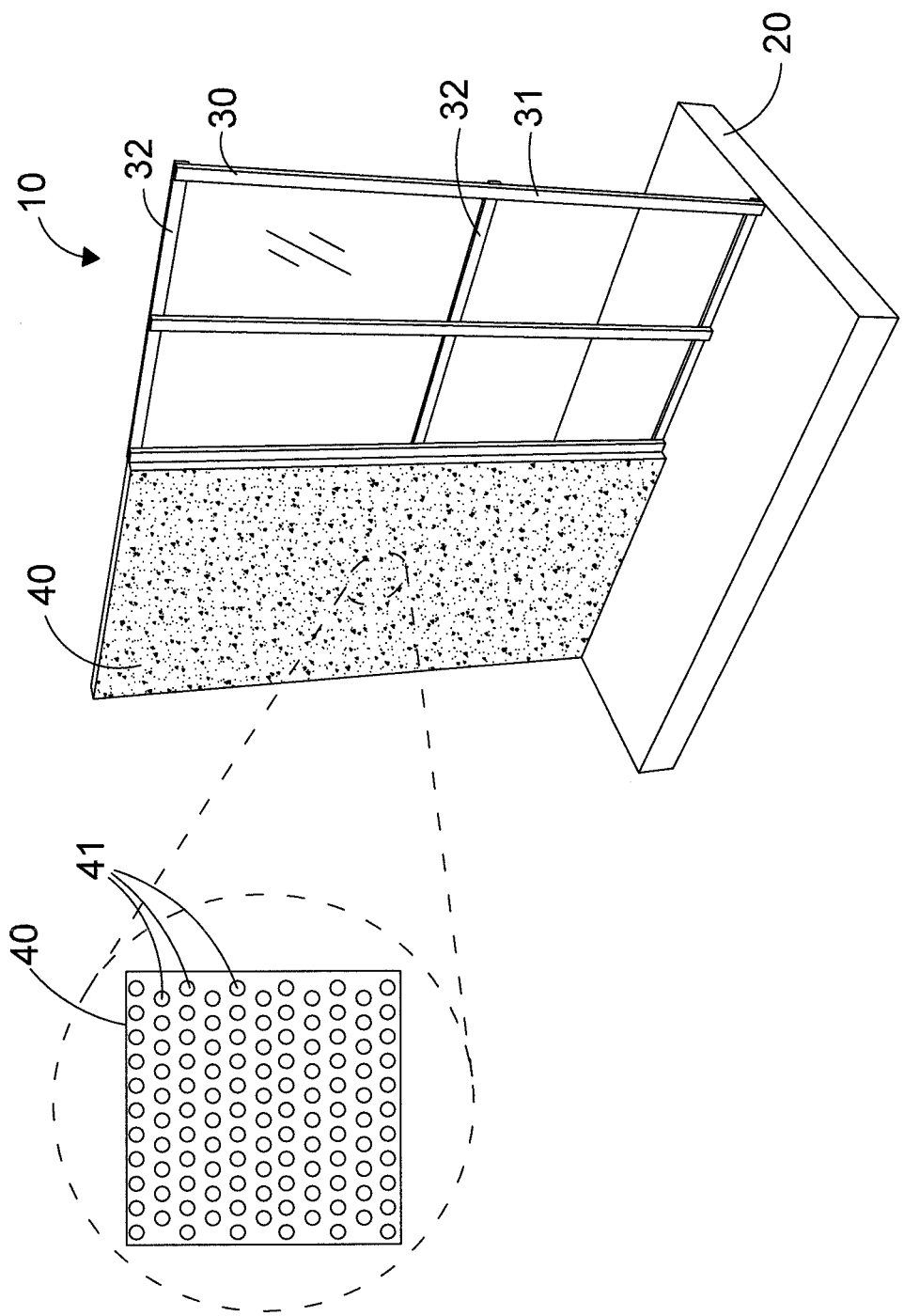
FIG. 1 shows a perspective side view of a partially assembled barrier assembly according to a first example.
Figure 2:
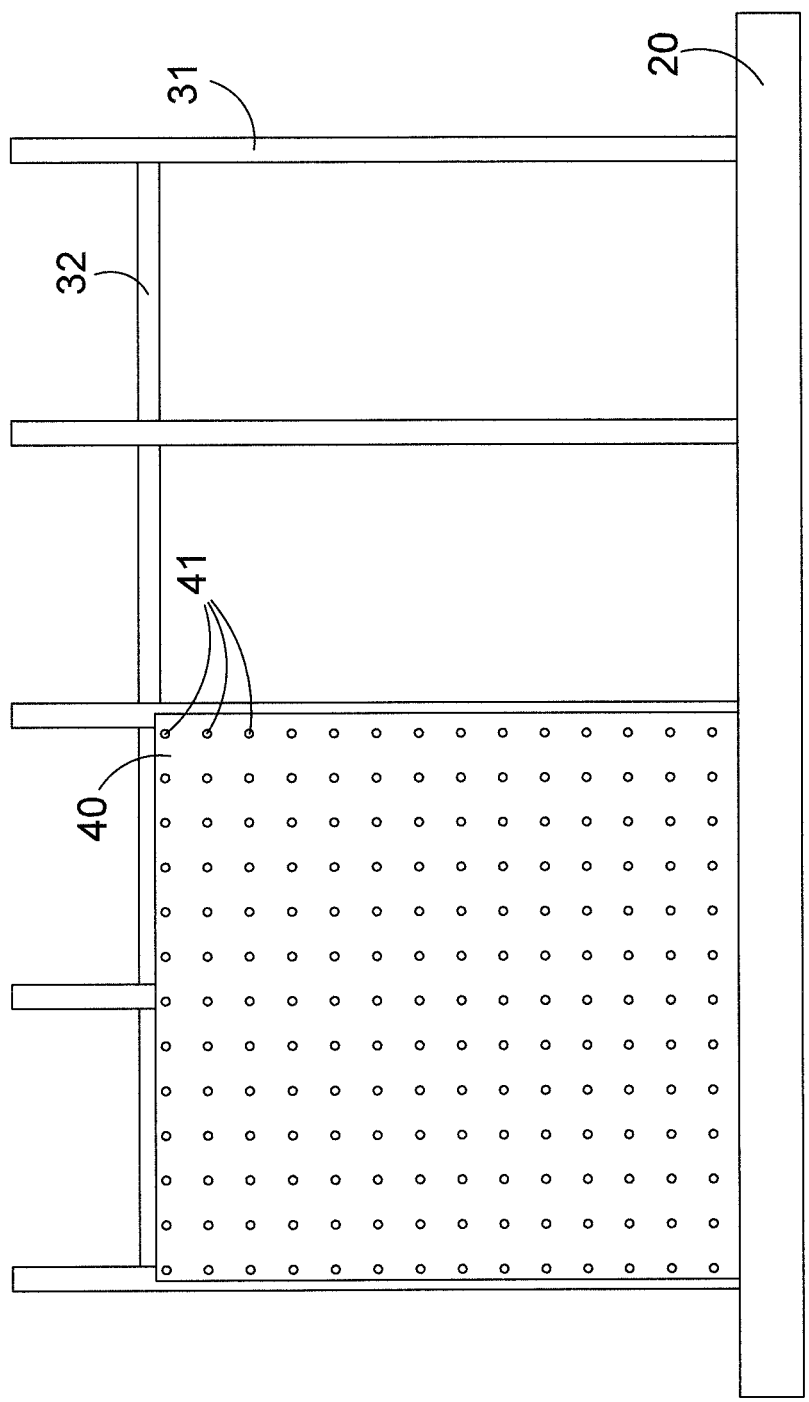
FIG. 2 shows a front view of FIG. 1 assembly.

Referring now to the figures, a first example of a barrier assembly 10 is shown in FIG. 1. The barrier assembly 10 comprises a frame 30 comprising vertical and horizontal frame members 31, 32 arranged to form substantially contiguous rectangular apertures, and in this example the frame 30 is generally planar. This results in a generally planar barrier assembly 10, but in some examples, the frame 30 need not be planar, and could have an arcuate structure, enabling a barrier that had a curved or arcuate appearance.

The frame members 31, 32 are secured together by suitable fastenings, for example bolts, and are mounted on a base 20, which is normally deployed on ground adjacent to a well or other structure from which leaking gas is to be contained.

The base 20 generally comprises a rectangular plinth, which can be formed from concrete or any suitable material, and is typically sufficient to provide ballast to assist with stability of the barrier assembly 10 when constructed. The base 20 is optionally deployed parallel to the ground, and typically resting upon it, and the frame 30 optionally extends perpendicularly with respect to a plane of the base 20, optionally extending vertically from the flat lower horizontal face of the base 20, although in some examples, the frame can extend at other angles.

The frame 30 has an inlet side (facing a high concentration of gas) and an outlet side (where the concentration of outlet gas is lower than on the inlet side), and in this example, each side of the frame 30 has a perforated plate 40 attached to the frame and supported by it. Optionally the plates 40 are secured to the frame 30 by fixings such as bolts etc. In this example, as best shown in FIG. 3, each side of the barrier assembly 10 has a perforated plate 40 with openings in the form of perforations 41 extending through the plate, thereby allowing gas passage from one side of the plate 40 to the other. The perforations are arranged in a regular repeating pattern across the plates 40. As best shown in FIG. 3, the plates 40 in this example are generally parallel to one another in the barrier assembly 10, and are spaced apart from one another by the width of the frame members 31, 32, leaving a gap 50 between the inner opposing surfaces of the plates 40.

As can be seen best in FIG. 3, this arrangement permits passage of gas through the plates 40 via the perforations 41 from the outside face of one plate (on the inlet side of the barrier assembly) through the inner space 50 between the plates 40, and through the plate 40 on the opposite side, so that gas can flow from the inlet side of the barrier assembly 10 to the outlet side.

In this example, the space 50 between the plates 40 is optionally filled with a matrix material 50m, which in this case comprises a plurality of tubular rings, which have a generally cylindrical wall, surrounding an internal bore that is open at each end. In this case, the rings are Raschig rings 51, which can optionally be formed from a porous ceramic material, which can optionally be particularly adapted to adsorb active or harmful components of the gas. The rings 51 increase the surface area available for absorption of the gas onto the rings 51 within the space 50 as the gas passes through the perforations 41 in the plates 40, and diffuses through the internal space 50 within the barrier assembly 10. Other forms of particulate matrix material can be used within the internal space 50.

As best shown in FIG. 4, in one alternative example, only a lower part of the plates 40a are provided with openings or perforations 41a, allowing passage of the gas through only a portion of the barrier assembly, and optionally in that arrangement, only the perforated portion of the space 50a is between the plates 40a is filled with the matrix 50m.

Optionally, the internal diameter of the Raschig rings is 5 to 10 mm, and the axial length of each ring is approximately 20 to 30 mm, although this can be varied in different examples, to provide different surface area ratios.

The openings or perforations 41 are sufficiently small as to contain the rings 51 within the internal space 50 within the barrier 10. Optionally, the rings 51 are simply filled into the internal space 50, without any sorting or alignment of the rings, so the various pathways through the internal space 50 between and through the rings 51 are essentially random, forcing the gas passing through the barrier assembly 10 to follow a path through the barrier assembly which is optionally labyrinthine, and which flows the gas through the matrix of the rushing rings 51 in an optionally random manner, permitting increased absorption of the gas onto the large surface area provided by the matrix, and increased diffusion of the gas in a lateral direction through the matrix material 50m.

Figure 6:
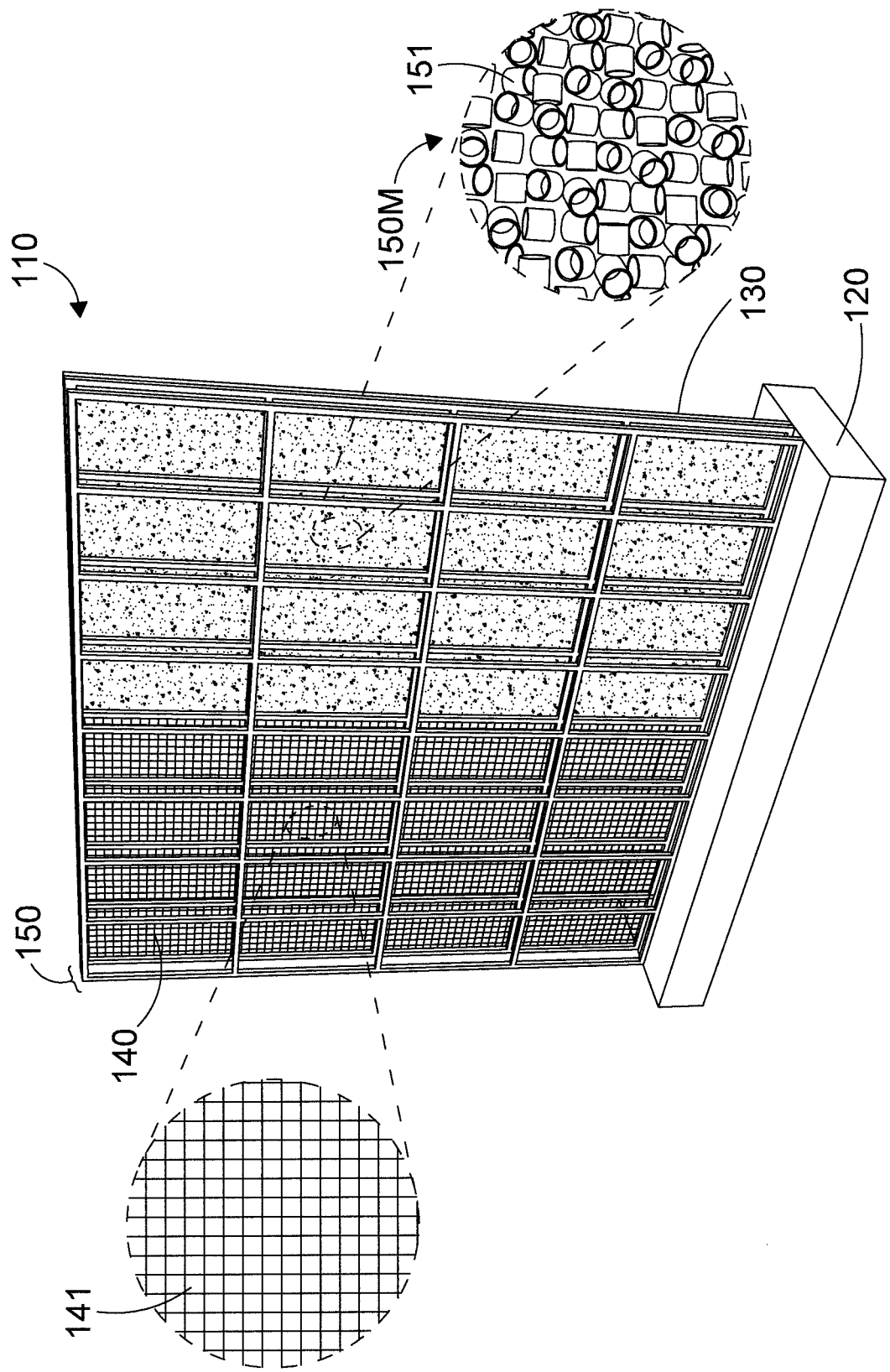
FIG. 6 shows a perspective side view of a partially assembled barrier assembly according to a second example.

Referring now to FIG. 6, a second example of a barrier assembly 110 is described, having a frame 130, mounted on a base 120 essentially as described for the first example, and having a matrix 150m contained within an internal space 150 between the two sides of the barrier 110. In this example, the matrix 150m also comprises a plurality of Raschig rings 151, which are optionally in a random arrangement as previously described.

The FIG. 6 example differs from the FIG. 1 example in that the perforated plates 40 in the first example are replaced by mesh screens 140 having mutually perpendicular warp and weft strands which are sufficiently tightly meshed to contain the Raschig rings 151 within the internal space 150 between the two faces of the barrier assembly 110, but which have openings which do not offer any practical barrier to the flow of gas through the barrier assembly 110, and allow practically free flow of gas through the screens 140, via gas-permeable openings 141 as best seen in the detailed view to the left of FIG. 6.

As described for the previous example, gas can pass freely through the screens 140 from one side of the barrier assembly 110 to the other, passing through the matrix 150m contained within the internal space 150.

In the FIG. 6 example, the Raschig rings 151 are optionally coated with a reactive material which in this example comprises a ferric hydride oxide, which is at least partially adsorbed onto the Raschig rings 151. In this example, the Raschig rings 151 are optionally porous, and at least some of the ferric hydride oxide is adsorbed onto them. In certain examples, the rings 151 can be treated with a liquid containing the reactive composition, which soaks into the porous rings 151 and is retained within the pores and on the surfaces of the rings, so that when the gas is adsorbed onto the rings 151, it reacts with the reactive composition to deactivate or otherwise combat the toxic and/or corrosive nature of the gas. Thus the toxic or corrosive nature of the gas is ameliorated within the space inside the barrier assembly, and any gas escaping from the outlet side of the wall members is less toxic and/or less corrosive as well as being less concentrated.

Upon passage of hydrogen sulphide through the barrier assembly, the hydrogen sulphide gas passes freely through the outer screens 140, and diffuses through a labyrinthine pathway within internal matrix 150m contained within the internal space 150 within the barrier assembly 110, and reacts with the ferric hydride oxide adsorbed onto the Raschig rings 151 dispersed within the matrix 150m. The reactive ferric hydride oxide reacts with the hydrogen sulphide to attenuate the toxicity and optionally the corrosive nature of the hydrogen sulphide. The diffusion of the gas within the matrix retains at least some of the gas within the space, and when it flows out of the barrier assembly on the outlet side of the barrier, its concentration is lower than at the inlet side, and is optionally below concentrations that adversely affect health or personnel or integrity of infrastructure.

Optionally, the matrix contained within the internal space of the barrier assembly 110 can be provided with a coating or treatment which increases its capacity for adsorption of the gas when passing through the matrix, without necessarily reacting chemically with the gas.

In use, the barrier assembly is constructed a suitable distance from the locus of a gas leak or possible future gas leak, for example, at the wellhead of an oil or gas well during the drilling phase, between the wellhead and a work site occupied by personnel, who would be at risk of exposure to uncontrolled escape of well gasses such as hydrogen sulphide. The barrier assembly is constructed of as many modular panels of base/frame/wall member as is required to shield the work site from the wellhead, for example, 2, 3, 4, 5 or more panels as shown in FIG. 1, and these are typically connected side-by-side to form a barrier between the worksite and the wellhead, so that gas escaping from the wellhead during drilling operations must diffuse through, over and around the barrier assembly before reaching the worksite. Upon the release of gas from the wellhead, the gas diffuses through the openings on an inlet side of the barrier assembly. The inlet side of the barrier generally has a high concentration of gas which could pose a risk to health of workers at the inlet side, or damage to plant and machinery at the inlet side. The gas flows through the perforated wall members at the inlet side and into the space between the wall members on opposite sides of the frame, but is at least partially retained in the space. Thus the gas diffusing out of the perforations on the outlet side is at a lower concentration than the gas at the inlet side, and is less likely to harm personnel or adversely affect the integrity of plant and equipment at the outlet side of the barrier assembly.

Example 1

The apparatus of FIGS. 1-5 was used in a test as follows: A source of $H_2S$ gas was allowed to escape from a gas source upstream of the barrier assembly of FIGS. 1-5. A hypothetical target located 200 m downstream of the gas source and on the other (downstream) side of the barrier assembly comprised a sensor capable of detecting the gas concentration at a height of 1.7 m. The sensor measured the gas concentration at the downstream location. The criterion for the test was that at least the concentration threshold of $H_2S$ of 600 ppm should be reached within 75 seconds of initiation of gas release. The 75 s time limit corresponds to an estimated time required to put on a mask. The barrier assembly, 5 m high and 20 m wide, comprised a perforated vertical wall having an empty space fraction of 25% obtained with ¼" holes spaced at approximately W. The target located 200 m from the release source was affected by a concentration of approximately 200 ppm after 75 s. It is confirmed the efficacy of the wall concept and the potentialities of a perforated wall according to the present disclosure.

Example 2: Test with a Perforated Wall Containing a $H_2S$ Scavenger

A barrier assembly according to FIG. 6, 10 m high, 0.25 m deep and 150 m long was considered as the basis for this example. The wall surfaces comprised, on each side, a square metal mesh of side 10 mm. The wall was randomly filled up of Raschig rings of size 25 mm comprising ferric nitrate as a scavenger.

The Raschig rings were prepared as follows: 100 kg of Grace commercial silica gel, Grace XWP silica gel grade 250 MP, surface area 175 $m^2$/g, pore volume 1.2 ml/g, were treated with an aqueous solution prepared with 50 liters of distilled water in which 40 kg of ferric nitrate [$Fe(NO_3)_3 \cdot 9H_2O$] were dissolved. The solid so obtained was dried at 100° C. overnight and then calcined at 550° C. for 6 hours, supplying a flow of air saturated with water vapour. In this way a scavenger material comprising ferric oxide hydrate dispersed on silica was obtained. The silica material incorporating the scavenger agent was then used to form Raschig rings by mixing it with 10% by weight of alumina as a binder and 5% by weight water acidified with 1% of acetic acid to form a paste (all percentage referred to the weight of silica material), and extruding and cutting it through a suitable die to obtain Raschig rings of size 25 mm.

The flow characteristics for the rings are: characteristic diameter $D_c$=9.2 mm and porosity $\varepsilon$=0.7. Ergun's equation is assumed to be valid for calculation of pressure losses across the bed:

$$\frac{|\Delta p|}{t} = \frac{150\mu}{D_c^2}\frac{(1-\varepsilon)^2}{\varepsilon^3}v + \frac{1.75\rho}{D_c}\frac{(1-\varepsilon)}{\varepsilon^3}v^2$$

where:
t is the thickness of the wall,
$\mu$ is the dynamic viscosity of the fluid,
$\rho$ is the density of the fluid,
v is the traverse velocity.
The wall was affected by:
1. A flow of air due to the presence of wind having a speed of 5 m/s 10 m above the ground and stability class D;
2. A jet of gas caused by the failure of a pressure vessel. It was assumed that the gas present in the jet after bursting had a velocity equal to the speed of sound in a circular cross-section of diameter such as to contain the entire flow emerging from the burst at atmospheric pressure. In this example it was assumed that this circular cross-section was located at a distance of 25 m from the wall and that the axis of the jet was perpendicular to the wall, at a distance of 2 m above the ground. The mean density and the temperature of the emitted gas was also set, together with the concentration of toxic gas ($H_2S$) at 3%.

The field of motion in this application can be assessed through digital solution of the Navier-Stokes equations and mass and thermal energy conservation performed using commercial software such as for example STAR-CCM+. The environmental conditions used for the computational wind tunnel were as follows:

released flow of gas 50 kg/s, at an overall temperature of 44° C.;

lower surface represented diagrammatically as an adiabatic wall having a roughness of 3 cm;

inlet cross-section to the calculation domain (downstream of the jet), lateral surfaces and upper surfaces having velocity and turbulence profiles set in relation to the quota according to the Panofsky-Dutton method and ambient temperature of 15° C.;

outlet surface area from the calculation domain at the set atmospheric pressure and ambient temperature.

The result obtained was that immediately downstream from the wall the $H_2S$ concentration in the jet fell to 1800 ppm and that 38% of the $H_2S$ flow affecting the wall passed through it.

Assuming a target located at a distance of 200 m from the release and a height above the ground of 1.7 m, the concentration recorded at the target 75 s after release was 64 ppm of $H_2S$.

Example 3 (Passive Wall)

It is considered a vertical perforated barrier located at 15 m from the release of gas. Void fraction is 25% and holes size ¼". The dimensions of the wall (i.e. barrier) are the same as the barrier of example 1.

It is considered the horizontal release of gas, the release size is 50 mm (hole size) and the position of the hole is @ 1 m above ground.

A gas flow (release pressure 150 barg, temperature 80° C.) with the following composition: methane as main component (97% mol) and $H_2S$ concentration at 3% mol/mol is directed toward the wall.

On the other side of the wall (outlet) the gas stream is calculated, by means of fluidodinamics simulations (using the same method as described in example 2), at 5 meters before the barrier, 150 meters after the barrier and 200 meters after the barrier.

|  | 5 meters before the barrier | 150 meters after the barrier ppm $H_2S$ | 200 meters after the barrier |
|---|---|---|---|
| Perforated barrier (Void fraction 25%. Holes size ¼") | 4745 | 98 | 67 |

Comparative Example 4 (Passive Wall)

It is considered a full vertical barrier (non-permeable to gas) having the same dimensions as the wall (i.e. barrier) of example 1, and located at 15 m from the release.

It is considered the horizontal release, the release size is 50 mm (hole size) and the position of the hole is @ 1 m above ground.

A Gas flow (release pressure 150 barg, temperature 80° C.) with the following composition: methane as main component (97% mol) and $H_2S$ concentration at 3% mol/mol is directed toward the wall.

On the other side of the wall (outlet) the gas stream is calculated, by means of fluidodinamics simulations (using the same method as described in example 2), at 5 meters before the barrier, 150 meters after the barrier and 200 meters after the barrier.

|  | 5 meters before the barrier | 150 meters after the barrier ppm $H_2S$ | 200 meters after the barrier |
|---|---|---|---|
| Vertical barrier | 4745 | 186 | 154 |

The comparison of the data of example 3 and comparative example 4 shows that at the same distance after barrier, the concentration of $H_2S$ is lower for the barrier according to the present disclosure.

The following examples 5 to 10 are directed to illustrate the barrier behaviour of reactive filling materials, depending on the thickness of the barrier.

Example 5 (Reactive Wall)

It is considered a porous barrier, filled with commercial scavenger R7J (i.e. a $H_2S$ scavenger) produced by Sulfatrap®, whose composition is reported below in table 1, whose diameter is 70-100 mesh, the thickness of the scavenger filling is 16 cm.

A gas flow (gas flow rate: 0.25 m s$^{-1}$, temperature: 25° C.) with the following composition: 14.99% $H_2S$ and 85.01% $N_2$, is directed toward the wall.

On the other side of the wall (outlet) the gas stream is detected after 1 minute and analyzed with a gas chromatograph.

The gas flow composition on the other side of the wall (outlet composition) shows a sharp decrease of $H_2S$ ($H_2S$ content: 33 ppm, $N_2$: one hundred complement).

Therefore, there is a sharp reduction of the toxicity for a person present on the other side (outlet) of the wall.

TABLE 2

Chemical composition of the commerical sorbents and their Sulphur Absorbent Capacity

| Scavenger SulfaTrap [Code] | Activated Charcoal CAS# 7440-44-0 C | Aluminium Oxide CAS# 1344-28-1 $Al_2O_3$ | Aluminio Silicate CAS# 1318-02-1 $Al_2SiO_5$ [% w/w] | Copper II Hydroxide CAS# 20427-59-2 Cu(OH)2 | Copper Oxide CAS# 1317-38-0 CuO | Iron III Oxide CAS#1309-37-1 $Fe_2O_3$ |
|---|---|---|---|---|---|---|
| R7J |  |  | <10 |  | >60 |  |

| Scavenger SulfaTrap [Code] | Manganese Carbonate CAS# 20344-49-4 $MnCO_3$ | Manganese Dioxide CAS# 598-62-9 $MnO_2$ | Potassium Hydroxide CAS# 1313-13-9 KOH [% w/w] | Potassium Nitrate CAS# 1310-58-3 $KNO_3$ | Propretary Material CAS# 7757-79-1 ND | Sulfur absorption capacity |
|---|---|---|---|---|---|---|
| R7J |  |  |  |  | <2 | 24 |

Example 6 (Reactive Wall)

It is considered a porous barrier, filled with commercial scavenger R7J produced by Sulfatrap®, whose composition is reported in the above table 1, whose diameter is 70-100 mesh, the thickness of the scavenger filling is 3.0 cm.

A gas flow (gas flow rate: 0.025 m s$^{-1}$, temperature: 25° C.) with the following composition: 3.01% H$_2$S and 96.99% N$_2$ is directed toward the wall.

On the other side of the wall (outlet) the gas stream is detected after 6 minute and analyzed with a gas chromatograph.

The gas flow composition on the other side of the wall (outlet composition) shows a sharp decrease of H$_2$S (H$_2$S content: 68 ppm, N$_2$ one hundred complement).

Therefore, there is a sharp reduction of the toxicity for a person present on the other side (outlet) of the reactive wall.

Example 7 (Reactive Wall)

It is considered a porous barrier, filled with commercial scavenger R7J produced by Sulfatrap®, whose composition is reported in the above table 1, whose diameter is 70-100 mesh, the thickness of the scavenger filling is 3 cm.

A gas flow (gas flow rate: 0.025 m s$^{-1}$, temperature: 25° C.) with the following composition: 3.01% H$_2$S and 96.99% N$_2$ is directed toward the wall.

On the other side of the wall (outlet) the gas stream is detected after 6 minute and analyzed with a gas chromatograph.

The gas flow composition on the other side of the wall (outlet composition) shows a sharp decrease of H$_2$S (H$_2$S content: 2025 ppm; N$_2$: one hundred percent complement).

Therefore, there is a sharp reduction of the toxicity for a person present on the other side (outlet) of the wall (barrier).

Example 8 (Reactive Wall)

It is considered a porous barrier, filled with commercial scavenger R7J produced by Sulfatrap®, whose composition is reported in table 1 above, whose diameter is 300-900 µm, the thickness of the scavenger filling is 1 cm.

A gas flow (GHSV 4000 min$^{-1}$, temperature 30° C.) with the following composition: 432 ppm H$_2$S and N$_2$ one hundred percent complement, is directed toward the wall.

On the other side of the wall (outlet) the gas stream is detected after 2 minute and analyzed with a gas chromatograph.

The gas flow composition on the other side of the wall (outlet composition) shows a sharp decrease of H$_2$S (H$_2$S content: 3.82 ppm; N$_2$ one hundred complement).

Therefore, there is a sharp reduction of the toxicity for a person present on the other side (outlet) of the wall.

Example 9 (Reactive Wall)

It is considered a porous barrier, filled with commercial scavenger R7J produced by Sulfatrap®, whose composition is reported in the above table 1, whose diameter is 300-900 µm, the thickness of the scavenger filling is 1 cm.

A gas flow (GHSV: 4000 min$^{-1}$, temperature: 30° C.) with the following composition: 300 ppm H$_2$S and N$_2$ one hundred percent complement, is directed toward the wall.

On the other side of the wall (outlet) the gas stream is detected after 2 minute and analyzed with a gas chromatograph.

The gas flow composition on the other side of the wall (outlet composition) show a sharp decrease of H$_2$S (H$_2$S content: 0.2 ppm, N$_2$ one hundred complement).

Therefore, there is a sharp reduction of the toxicity for a person present on the other side (outlet) of the wall.

Example 10 (Reactive Wall)

It is considered a porous barrier, filled with commercial scavenger R7J produced by Sulfatrap®, whose composition is reported in table 1 above, whose diameter is 300-900 µm, the thickness of the scavenger filling is 1 cm.

A gas flow (GHSV: 4000 min$^{-1}$, temperature: 30° C.) with the following composition: 200 ppm H$_2$S and N$_2$ one hundred percent complement, is directed toward the wall.

On the other side of the wall (outlet) the gas stream is detected after 2 minute and analyzed with a gas chromatograph.

The gas flow composition on the other side of the wall (outlet composition) show a sharp decrease of H$_2$S (H$_2$S content 0.12 ppm; N$_2$ one hundred complement).

Therefore, there is a sharp reduction of the toxicity for a person present on the other side (outlet) of the wall.

The invention claimed is:

1. A method of confining a gas leak to protect personnel at worksites and/or non-personnel third parties in residential areas from escapes of gas using a barrier assembly, the method comprising:
   arranging the barrier assembly in proximity to a gas leak between a work site for personnel and the gas leak,
   wherein the barrier assembly comprises a first and a second gas-permeable wall member, each having openings therein to permit passage of gas through the respective gas-permeable wall member, and
   wherein the first and second gas-permeable wall members are connected to each other on opposite sides of a lightweight frame,
   wherein the first and second gas-permeable wall members are spaced apart by a space within the barrier assembly between opposing inner faces of the first gas-permeable wall member and the second gas-permeable wall member on opposite sides of the lightweight frame; and
   diffusing the gas through openings in at least a portion of the first and second gas-permeable wall members.

2. The method as claimed in claim 1, the method further comprising:
   combatting lateral and vertical spread of leaked gas by diffusing the gas through the barrier assembly.

3. The method as claimed in claim 1, further comprising:
   diffusing the gas into the space within the barrier assembly.

4. The method as claimed in claim 3, wherein the space formed between the first and second gas-permeable wall members is at least partially filled with a material, and wherein the method further comprises:
   forcing the gas diffusing through the space to diffuse around the material within the space.

5. The method as claimed in claim 4, wherein the material comprises a reactive material adapted to react with the gas, and wherein the method includes reacting the reactive material with the gas to combat toxicity and/or corrosive nature of the gas.

6. The method as claimed in claim 4, wherein the method includes retaining at least some of the gas within the space by adsorbing at least some of the gas onto the material within the space.

7. The method as claimed in claim 4, wherein the method includes treating the material within the space with a liquid comprising a composition adapted to react with the gas and to combat its toxicity or corrosive nature, before passing the gas through the barrier assembly.

8. The method as claimed in claim 1, further comprising flowing gas from one side of the barrier assembly to the other.

9. A method of confining a gas leak to protect personnel at worksites and/or non-personnel third parties in residential areas from escapes of gas using a barrier assembly comprising a gas-permeable wall member having openings therein adapted to permit passage of gas through the gas-permeable wall member, the method comprising:

arranging the barrier assembly in proximity to a gas leak between a work site for personnel and the gas leak, wherein the barrier assembly further comprises another gas-permeable wall member connected to the gas-permeable wall member on opposite sides of a frame, wherein the gas-permeable wall member and the another gas-permeable wall member are spaced apart by a space within the barrier assembly between opposing inner faces of the gas-permeable wall member and the another gas-permeable wall member on opposite sides of the frame, wherein the barrier assembly comprises first and second barrier assemblies, wherein the first barrier assembly is closer to the gas leak than the second barrier assembly, wherein the first barrier assembly incorporates a reactive composition within a space, and wherein the second barrier assembly does not include a reactive composition within the space; and diffusing the gas through openings in at least a portion of the gas-permeable wall member.

10. The method according to claim 1, wherein the barrier assembly comprises a base, and the method further comprises orienting the first gas-permeable wall member and the second gas-permeable wall member to extend in a direction that is perpendicular to a face of the base.

11. The method according to claim 1, wherein the first gas-permeable wall member of the barrier assembly comprises a mesh through which the gas diffuses.

* * * * *